United States Patent
Yamamoto et al.

(10) Patent No.: US 10,975,189 B2
(45) Date of Patent: Apr. 13, 2021

(54) PROCESS FOR PRODUCING OXYMETHYLENE COPOLYMER

(71) Applicants: MITSUBISHI GAS CHEMICAL COMPANY, INC., Tokyo (JP); THAI POLYACETAL CO., LTD, Bangkok (TH)

(72) Inventors: Yuuta Yamamoto, Mie (JP); Daisuke Sunaga, Mie (JP); Akira Ito, Tokyo (JP); Wandee Thuamthong, Rayong (TH); Yupin Pattamamongkolchai, Rayong (TH)

(73) Assignees: MITSUBISHI GAS CHEMICAL COMPANY, INC., Tokyo (JP); THAI POLYACETAL CO., LTD., Bangkok (TH)

( * ) Notice: Subject to any disclaimer, the term of this patent is extended or adjusted under 35 U.S.C. 154(b) by 184 days.

(21) Appl. No.: 16/084,083

(22) PCT Filed: Mar. 13, 2017

(86) PCT No.: PCT/JP2017/009939
§ 371 (c)(1),
(2) Date: Sep. 11, 2018

(87) PCT Pub. No.: WO2017/159602
PCT Pub. Date: Sep. 21, 2017

(65) Prior Publication Data
US 2020/0216598 A1    Jul. 9, 2020

(30) Foreign Application Priority Data
Mar. 14, 2016 (JP) ................. 2016-049760

(51) Int. Cl.
| C08G 2/24 | (2006.01) |
| C08G 2/06 | (2006.01) |
| C08G 2/28 | (2006.01) |
| C08L 59/04 | (2006.01) |
| C08K 5/17 | (2006.01) |

(52) U.S. Cl.
CPC ............. *C08G 2/24* (2013.01); *C08G 2/06* (2013.01); *C08G 2/28* (2013.01); *C08L 59/04* (2013.01); *C08K 5/17* (2013.01)

(58) Field of Classification Search
CPC ... C08G 2/28; C08G 2/10; C08G 2/22; C08G 2/24; C08G 2/06; C08L 59/04; C08K 5/32
USPC ...................................................... 528/232
See application file for complete search history.

(56) References Cited

U.S. PATENT DOCUMENTS 9,902,797 B2 *  2/2018  Nakaya ............... C08G 2/10
2005/0040359 A1  2/2005  Stroeffer et al.
2005/0228086 A1 * 10/2005  Mehrer ................ C07D 519/00
                                                       524/99
2009/0062503 A1  3/2009  Nagai et al.
2011/0196082 A1  8/2011  Hornbach et al.
2014/0323621 A1 10/2014  Niuchi
2015/0112018 A1  4/2015  Nakaya et al.
2015/0299427 A1 10/2015  Hsieh et al.
2016/0168324 A1  6/2016  Okui et al.

FOREIGN PATENT DOCUMENTS

| GB | 2 331 991 A | 6/1999 |
| JP | 39-6390 B1 | 5/1939 |
| JP | 58-34819 A | 3/1983 |
| JP | 2-35772 B | 8/1990 |
| JP | 8-208784 A | 8/1996 |
| JP | 11-35791 A | 2/1999 |
| JP | 11-269374 A | 10/1999 |
| JP | 2000-290334 A | 10/2000 |
| JP | 2005-507377 | 3/2005 |

(Continued)

OTHER PUBLICATIONS

Supplementary European Search Report dated Oct. 24, 20919 in EP Application No. 17766602.1.

(Continued)

*Primary Examiner* — Kuo Liang Peng
(74) *Attorney, Agent, or Firm* — Greenblum & Bernstein, P.L.C.

(57) ABSTRACT

The present invention is to provide a process for producing an oxymethylene copolymer, in which deteriorate due to oxidation hardly occurs, an amount of formaldehyde generated from the product when stored for a long time under environment of high temperature and high humidity is reduced, and occurrence of mold deposit during molding is small. A process for producing an oxymethylene copolymer includes Step 1 of polymerizing polymer raw materials containing trioxane and a comonomer in the presence of a specific amount of an acid catalyst, Step 2 of adding a hydroxylamine compound represented by the following general formula (1):

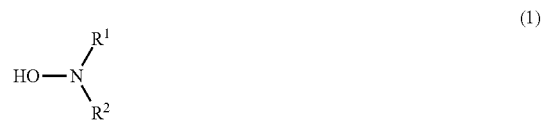

(1)

to a product obtained in the Step 1 in an amount of 1 to 20-fold mol based on an amount of the acid catalyst and mixing these, and Step 3 of further melting and kneading a mixture of the product and the hydroxylamine compound obtained in the Step 2.

7 Claims, No Drawings

(56) References Cited

FOREIGN PATENT DOCUMENTS

| JP | 2010-70222 A | 4/2010 |
|----|--------------|--------|
| JP | 2011527358 A | 10/2011 |
| JP | 2015-206025 A | 11/2015 |
| WO | 2013/094393 A | 6/2013 |
| WO | 2013/172270 A1 | 11/2013 |
| WO | 2015/005169 A1 | 1/2015 |

OTHER PUBLICATIONS

U.S. Appl. No. 14/902,652 to Okui et al., which was filed on Jan. 4, 2016.
U.S. Appl. No. 14/400,075 to Nakaya et al., which was filed on Nov. 10, 2014.
International Search Report in International Patent Application No. PCT/JP2017/009939, dated May 9, 2017.
International Preliminary Report on Patentability in International Patent Application No. PCT/JP20171009939, dated Sep. 18, 2018.
Notification of Reasons for Rejection issued in JP Patent Application No. 2018-505911, dated Feb. 24, 2021, English translation.

\* cited by examiner

PROCESS FOR PRODUCING OXYMETHYLENE COPOLYMER

TECHNICAL FIELD

The present invention relates to a process for producing an oxymethylene copolymer.

BACKGROUND ART

An oxymethylene copolymer has widely been used in various industrial fields since it is excellent in mechanical, chemical, physical and electrical characteristics. In general, the oxymethylene copolymer is produced by polymerizing trioxane and a comonomer such as an alkylene oxide or a cyclic formal in the presence of an acidic polymerization catalyst (acid catalyst). In the crude oxymethylene copolymer obtained by the polymerization reaction, a deactivator is generally added thereto to deactivate an acid catalyst to suppress the depolymerization reaction.

Various methods have conventionally been proposed as a method for deactivating the acid catalyst. For example, it has been proposed a method in which an acid catalyst is deactivated by contacting with an aqueous solution or an organic solvent solution each containing a basic neutralizing agent such as triethylamine, tributylamine, calcium hydroxide, and the like (for example, see Patent document 1). However, this method uses a large amount of a deactivator solution equal to or more than the same weight of that of a crude oxymethylene copolymer, so that separation of the deactivator solution and the crude oxymethylene copolymer and a solvent recovery step are required, whereby the catalyst deactivating step becomes very complicated and thus it cannot be said that it is an industrially advantageous method.

In addition, as a method of adding a small amount of a deactivator to the crude oxymethylene copolymer, there have been proposed, for example, a method of using an organic solvent solution of a tertiary phosphine compound as a deactivator, and a method of using an organic solvent solution of a specific hindered amine compound (for example, see Patent documents 2 and 3). Even in the oxymethylene copolymer in which the acid catalyst is deactivated by adding the deactivator, however, it has been known that it is poor in thermal stability when it is alone, and it is easily decomposed by the depolymerization reaction from the end of the copolymer or cutting of the main chain by the thermal decomposition reaction. In addition, it has also been known that formaldehyde formed by the depolymerization reaction or the thermal decomposition reaction is further oxidized to form formic acid, and the decomposition reaction of the oxymethylene copolymer is promoted. Therefore, for the purpose of suppressing the above-mentioned depolymerization reaction or the thermal decomposition reaction, in general, an antioxidant such as a sterically hindered phenol, hydroxylamine, etc., a heat resistant stabilizer such as an amine-substituted triazine compound, a hindered amine, etc., is/are added to the oxymethylene copolymer, and melted and kneaded to be commercially sold as an oxymethylene copolymer composition (polyacetal resin composition) (for example, see Patent documents 4 and 5).

PRIOR ART DOCUMENTS

Patent Documents

Patent document 1: JP Hei. 2-035772B
Patent document 2: JP 2000-290334A
Patent document 3: JP Hei. 8-208784A
Patent document 4: WO 2013/094393A
Patent document 5: JP 2010-70222A

SUMMARY OF THE INVENTION

Problems to be Solved by the Invention

Even in the oxymethylene copolymer obtained by the above-mentioned methods, however, there remain the problems that deterioration due to oxidation, generation of formaldehyde from the product, in particular, increase in an amount of formaldehyde generated from the product when stored for a long time under environment of high temperature and high humidity, occurrence of mold deposit (hereinafter also referred to as "MD") during molding and the like, whereby further improvement is required in the market.

That is, an object of the present invention is to provide a process for producing an oxymethylene copolymer, in which deteriorate due to oxidation hardly occurs, an amount of formaldehyde generated from the product, in particular, an amount of formaldehyde generated from the product when stored for a long time under environment of high temperature and high humidity is reduced, and occurrence of mold deposit during molding is small.

Means to Solve the Problems

The present inventors have intensively studied to solve the above-mentioned problems, and as a result, they have found that an oxymethylene copolymer, in which deteriorate due to oxidation hardly occurs, an amount of formaldehyde generated from the product, in particular, an amount of formaldehyde generated from the product when stored for a long time under environment of high temperature and high humidity is reduced, and occurrence of mold deposit during molding is small when a specific hydroxylamine compound is added to a product obtained by polymerizing polymerization raw materials containing trioxane and a comonomer in the presence of a specific amount of an acid catalyst, in an amount of 1 to 20-fold mol to an amount of an acid catalyst, mixed and further melted and kneaded, whereby they have completed the present invention.

That is, the present invention is as follows.

[1] A process for producing an oxymethylene copolymer which comprises

Step 1 of polymerizing polymer raw materials containing trioxane and a comonomer in the presence of an acid catalyst in an amount of $1.0 \times 10^{-5}$ mol or more and $1.0 \times 10^{-4}$ mol or less based on 1 mol of the trioxane, Step 2 of adding a hydroxylamine compound represented by the following general formula (1):

(1)

wherein $R^1$ and $R^2$ each independently represent a hydrogen atom or an organic group having 1 to 20 carbon atoms, to a product obtained in the Step 1 in an amount of 1 to 20-fold mol based on an amount of the acid catalyst and mixing these, and Step 3 of further melting and kneading a mixture of the product and the hydroxylamine compound obtained in the Step 2.

[2] The process for producing an oxymethylene copolymer described in [1], wherein the hydroxylamine compound is a hydroxylamine compound in which $R^1$ and $R^2$ each independently represent a hydrogen atom, a linear or branched alkyl group having 1 to 20 carbon atoms, an aryl group having 6 to 20 carbon atoms or an arylalkyl group having 7 to 20 carbon atoms.

[3] The process for producing an oxymethylene copolymer described in [1] or [2], wherein the hydroxylamine compound is N,N-diethylhydroxylamine.

[4] The process for producing an oxymethylene copolymer described in any of [1] to [3], wherein the amount of the hydroxylamine compound added in the Step 2 is 1 to 5-fold mol based on the amount of the acid catalyst.

[5] The process for producing an oxymethylene copolymer described in any of [1] to [4], wherein the acid catalyst is at least one selected from the group consisting of boron trifluoride dihydrate, boron trifluoride diethyl etherate, boron trifluoride dibutyl etherate.

[6] The process for producing an oxymethylene copolymer described in any of [1] to [5], wherein the comonomer is at least one selected from the group consisting of ethylene oxide, propylene oxide, butylene oxide, styrene oxide, methyl glycidyl ether, ethyl glycidyl ether, butyl glycidyl ether, phenyl glycidyl ether, 1,3-dioxolane, propylene glycol formal, diethylene glycol formal, triethylene glycol formal, 1,4-butanediol formal, 1,5-pentanediol formal and 1,6-hexanediol formal.

[7] The process for producing an oxymethylene copolymer described in any of [1] to [6], wherein the oxymethylene copolymer contains an oxymethylene group and an oxyalkylene group having 2 or more carbon atoms, and a content of the oxyalkylene group having 2 or more carbon atoms contained in the oxymethylene copolymer is 0.4 mol or more and 15 mol or less based on 100 mol of a total of a molar amount of the oxymethylene group and a molar amount of the oxyalkylene group.

[8] An oxymethylene copolymer which is an oxymethylene copolymer obtained by the producing process described in any of [1] to [7], wherein a content of the hydroxylamine compound in the oxymethylene copolymer is 5 ppm by mass or more and 2,000 ppm by mass or less.

[9] A process for producing an oxymethylene copolymer which comprises Step 1 of polymerizing polymerization raw materials containing trioxane and a comonomer(s) in the presence of an acid catalyst, Step 2 of adding a hydroxylamine compound represented by the following general formula (1):

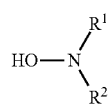
(1)

wherein $R^1$ and $R^2$ each independently represent a hydrogen atom or an organic group having 1 to 20 carbon atoms, to a product obtained in the Step 1 and mixing these, and Step 3 of further melting and kneading a mixture of the product and the hydroxylamine compound obtained in the Step 2, wherein the hydroxylamine compound is added as a deactivating agent of the acid catalyst to deactivate the acid catalyst in Step 2 and Step 3.

Effects of the Invention

According to the process for producing an oxymethylene copolymer of the present invention, it can be provided an oxymethylene copolymer, in which deteriorate due to oxidation hardly occurs, an amount of formaldehyde generated from the product, in particular, an amount of formaldehyde generated from the product when stored for a long time under environment of high temperature and high humidity is reduced, and occurrence of mold deposit during molding is small.

EMBODIMENTS TO CARRY OUT THE INVENTION

In the following, the present invention is explained in detail. The process for producing an oxymethylene copolymer of the present invention comprises Step 1 of polymerizing polymer raw materials containing trioxane and a comonomer in the presence of a specific amount of an acid catalyst; Step 2 of adding a hydroxylamine compound represented by the general formula (1) mentioned later to a product obtained in the Step 1 in an amount of 1 to 20-fold mol based on an amount of the acid catalyst, and mixing these; and Step 3 of further melting and kneading a mixture of the product and the hydroxylamine compound obtained in the Step 2. By producing the oxymethylene copolymer as mentioned above, an oxymethylene copolymer, in which deteriorate due to oxidation hardly occurs, an amount of formaldehyde generated from the product, in particular, an amount of formaldehyde generated from the product when stored for a long time under environment of high temperature and high humidity is reduced, and occurrence of mold deposit during molding is small, can be obtained. The reason will be described in the following, but the invention is not limited thereto.

In the process for producing an oxymethylene copolymer of the present invention, in Step 2, the hydroxylamine compound represented by the general formula (1) mentioned below is added to the product obtained in Step 1 in an amount of 1 to 20-fold mol based on an amount of the acid catalyst and mixing the materials, whereby the hydroxylamine compound is considered to act as a deactivator of the acid catalyst used in Step 1, and at the same time, act as an antioxidant of the product obtained in Step 1. According to this procedure, it can be presumed that depolymerization of the product formed in Step 1 can be suppressed, so that formation of formic acid due to oxidation of formaldehyde derived from unreacted raw materials or formaldehyde derived from a hemiformal terminal group and decomposition reaction caused by formic acid can be suppressed. In addition, in Step 3, by further melting and kneading a mixture of the product obtained in Step 2 and the hydroxylamine compound, deactivation of the acid catalyst used in Step 1 proceeds further, and at the same time, an action as an antioxidant is considered to be increased. According to this procedure, it can be presumed that depolymerization of the product formed in Step 1 can be further suppressed, and formation of formic acid due to oxidation of formaldehyde derived from unreacted raw materials or formaldehyde derived from a hemiformal terminal group and decomposition reaction caused by formic acid can be more suppressed.

Thus, in both Steps of addition and mixing these, and melting and kneading, the hydroxylamine compound represented by the general formula (1) mentioned below is considered to act as a deactivator of the acid catalyst used in Step 1, and at the same time, act as an antioxidant, so that an oxymethylene copolymer having less deterioration due to oxidation (hereinafter also referred to as "oxidative deterioration"), and less formation of an amount of formaldehyde generated from the product can be obtained. Also, the hydroxylamine compound acts as a formaldehyde scavenger in addition to its action as a deactivator and antioxidant so that, for example, an oxymethylene copolymer having less formation of an amount of formaldehyde generated from the product, in particular, an amount of formaldehyde generated from the product when stored for a long time under environment of high temperature and high humidity, can be effectively obtained. Further, when the hydroxylamine compound is used, the hydroxylamine compound itself is hardly deposited as MD (mold deposit) at the time of molding, so that an oxymethylene copolymer with less contamination of the mold during molding can be obtained.

Oxymethylene Copolymer

First, the oxymethylene copolymer obtained by the process for producing an oxymethylene copolymer of the present invention is explained. The oxymethylene copolymer of the present invention is a copolymer obtained by carrying out the above-mentioned Steps 1 to 3, and is a polymer compound generally containing an oxymethylene group (—OCH$_2$—) and an oxyalkylene group having 2 or more carbon atoms as constitutional units. The oxyalkylene group having 2 or more carbon atoms is not particularly limited and may be mentioned, for example, an oxyethylene (—OCH$_2$CH$_2$—) group, an oxypropylene (—OCH(CH$_3$)CH$_2$—) group, an oxybutylene (—OCH$_2$CH$_2$CH$_2$CH$_2$—) group, etc. Among them, an oxyethylene group (—OCH$_2$CH$_2$—) is particularly preferable as the oxyalkylene group having 2 or more carbon atoms.

A content of the oxyalkylene group having 2 or more carbon atoms contained in the oxymethylene copolymer is not particularly limited, and it is preferably 0.4 mol or more and 15 mol or less, more preferably 0.4 mol or more and 10 mol or less, and particularly preferably 0.4 mol or more and 5.0 mol or less based on 100 mol of the total of the molar amount of the oxymethylene group and the molar amount of the oxyalkylene group.

The oxymethylene copolymer obtained by the production process of the present invention contains the hydroxylamine compound represented by the general formula (1) mentioned below. Also, as will be described below, an optional component(s) which is/are added in a range which does not impair the object of the present invention may be contained, if necessary. Accordingly, the obtained oxymethylene copolymer is an oxymethylene copolymer composition, and in "the oxymethylene copolymer" of the present invention, the oxymethylene copolymer composition is also contained.

A content of the hydroxylamine compound in the oxymethylene copolymer is preferably 5 ppm by mass or more and 2,000 ppm by mass or less, more preferably 5 ppm by mass or more and 500 ppm by mass or less, and particularly preferably 5 ppm by mass or more and less than 100 ppm by mass. The content of the hydroxylamine compound herein mentioned means a total content (an amount in terms of the hydroxylamine compound) of a free hydroxylamine compound, a hydroxylamine compound existing in a form of a salt with the acid catalyst, and a product formed by reacting formaldehyde and the hydroxylamine compound contained in the oxymethylene copolymer. The method of measuring the content of the hydroxylamine compound is not particularly limited and, for example, it can be measured by a total nitrogen meter (TN meter).

The oxymethylene copolymer obtained by the production process of the present invention has a characteristic that it has less deterioration due to oxidation (oxidative deterioration). Easiness of oxidative deterioration can be known, for example, from the difference (ΔMI value) between the MI value (melt index) in the case of melting and kneading in an air atmosphere and the MI value in the case of melting and kneading in an inert gas atmosphere such as nitrogen, etc. Here, ΔMI value=(MI value in the case of melting and kneading in an air atmosphere)—(MI value in the case of melting and kneading in an inert gas atmosphere). When the ΔMI value is smaller, oxidative deterioration is less and the material is excellent. The ΔMI value can be measured by the method described in Examples of the present specification. The ΔMI value measured by the method described in Examples is preferably less than 1.0.

The oxymethylene copolymer obtained by the production process of the present invention has a characteristic that an amount of formaldehyde generated from the product, in particular, the amount of formaldehyde generated from the product when stored for a long time under environment of high temperature and high humidity is small. The amount of formaldehyde generated from the product can be evaluated, for example, by quantitatively determining the amount of formaldehyde generated when a sample which has been subjected to hot air drying at 120° C. for 3 hours is subjected to heat treatment using headspace gas chromatography, and is used as an evaluation of the amount of formaldehyde generated from the oxymethylene copolymer immediately after production. On the other hand, the amount of formaldehyde generated when stored for a long time under environment of high temperature and high humidity can be evaluated, for example, by quantitatively determining the amount of formaldehyde generated when a sample which has been subjected to humidification treatment under conditions of a temperature of 80° C. and a relative humidity of 95% for 96 hours is subjected to heat treatment using headspace gas chromatography, and is used as an evaluation of the amount of formaldehyde generated from the oxymethylene copolymer after humidification treatment. The amount of formaldehyde generated from the oxymethylene copolymer immediately after production and after humidification treatment, quantified by the method described in Examples of the present specification, is preferably less than 80 ppm by mass immediately after production, and is preferably less than 110 ppm by mass after humidification treatment.

The oxymethylene copolymer obtained by the production process of the present invention has a characteristic that the MD during molding is small. The amount of the MD can be evaluated, for example, by observing the mold under magnification after continuously forming 4,000 shots using an injection molding apparatus.

Process for Producing Oxymethylene Copolymer

Next, the process for producing an oxymethylene copolymer of the present invention is explained in detail.

Step 1

The process for producing an oxymethylene copolymer of the present invention comprises Step 1 of polymerizing polymerization raw materials containing trioxane and a comonomer in the presence of a specific amount of an acid catalyst.

Trioxane

Trioxane (1,3,5-trioxane) is a cyclic trimer of formaldehyde. The trioxane that can be used for producing the oxymethylene copolymer of the present invention is not particularly limited as long as it is a cyclic trimer of formaldehyde, and may be a commercially available product or a product manufactured by a conventionally known production process. The process for producing the trioxane is also not particularly limited. In addition, the trioxane may contain amines as a stabilizer as long as it does not significantly inhibit the polymerization reaction. A content of the amines as a stabilizer is usually 0.00001 to 0.003 mmol, preferably 0.00001 to 0.0005 mmol, particularly preferably 0.00001 to 0.0003 mmol per mol of trioxane.

The amines are not particularly limited, and may be mentioned an amine compound having an alcoholic hydroxyl group(s) in the molecule, such as a primary amine, a secondary amine, a tertiary amine, triethanolamine, etc. Here, the alcoholic hydroxyl group means a hydroxyl group directly bonded to the carbon atom other than the aromatic hydrocarbon and the carbonyl group. Among them, triethanolamine is preferable.

Trioxane may sometimes contain water, formic acid, methanol and formaldehyde as impurities inevitably generated when it is produced industrially, and the trioxane containing these impurities can also be used. In that case, an amount of water, formic acid, methanol and formaldehyde in the trioxane is preferably 500 ppm by mass or less in total in the trioxane, more preferably 450 ppm by mass or less, and particularly preferably 400 ppm by mass or less. Among them, a content of water is preferably 200 ppm by mass or less, more preferably 100 ppm by mass or less, and particularly preferably 50 ppm by mass or less.

Comonomer

The comonomer is not particularly limited as long as it can introduce an oxyalkylene group having 2 or more carbon atoms to the oxymethylene copolymer as a constitutional unit and may be mentioned, for example, a cyclic ether, a glycidyl ether compound and a cyclic formal. Among them preferred is a comonomer having 2 to 10 carbon atoms, which is one or more selected from the group consisting of, for example, a cyclic ether such as ethylene oxide, propylene oxide, butylene oxide, styrene oxide and 1,3-dioxolane; a glycidyl ether compound such as methyl glycidyl ether, ethyl glycidyl ether, butyl glycidyl ether and phenyl glycidyl ether; and a cyclic formal such as propylene glycol formal, diethylene glycol formal, triethylene glycol formal, 1,4-butanediol formal, 1,5-pentanediol formal and 1,6-hexanediol formal. Among them, ethylene oxide, 1,3-dioxolane, diethylene glycol formal and 1,4-butanediol formal are preferable, and 1,3-dioxolane is particularly preferable. One of the comonomer can be used alone, or two or more thereof can be used in combination. The comonomer is used for constituting an oxyalkylene group having 2 or more carbon atoms in the oxymethylene copolymer.

A content of the comonomer in the polymerization raw materials is usually 1 to 50 parts by mass based on 100 parts by mass of the trioxane, preferably 1 to 30 parts by mass, and particularly preferably 1 to 13 parts by mass.

Acid Catalyst

The acid catalyst is not particularly limited and, for example, a cationic catalyst which can be used for producing an oxymethylene copolymer can be used. As such a cationic catalyst, it is preferable to use a Lewis acid. As the Lewis acid, there may be mentioned, for example, a Lewis acid such as boron trifluoride, tin tetrachloride, titanium tetrachloride, phosphorus pentachloride, phosphorus pentafluoride, arsenic pentafluoride, and antimony pentafluoride, etc., and a complexed compound or a chlorinated compound of these Lewis acids, and, among them, a compound containing boron trifluoride is preferable, and boron trifluoride dehydrate or boron trifluoride diethyl etherate and boron trifluoride dibutyl etherate which are a coordination complex with an ether are particularly preferable. One of these acid catalysts can be used alone, or two or more thereof can be used in combination.

An amount of the acid catalyst to be used, in particular, $BF_3 \cdot OEt_2$ is generally in the range of $1.0 \times 10^{-5}$ mol or more and $1.0 \times 10^{-4}$ mol or less based on 1 mol of the amount of trioxane to be used, preferably $1.0 \times 10^{-5}$ mol or more and $7.0 \times 10^{-5}$ mol or less, and particularly preferably $2.0 \times 10^{-5}$ mol or more and $5.0 \times 10^{-5}$ mol or less. By making the amount of the acid catalyst to be used the upper limit value or less of the above-mentioned range, an amount of a hemiacetal terminal group (—O—$CH_2$—OH) which is easily thermally decomposed or a formic acid ester terminal group (—O—CH=O) which is easily hydrolyzed, etc., in the obtainable oxymethylene copolymer becomes more little, and deactivation of the acid catalyst is further easier and depolymerization reaction hardly occurs when heated. On the other hand, by making the amount of the acid catalyst to be used the lower limit value or more of the above-mentioned range, loss of trioxane due to insufficient progress of the polymerization reaction can be reduced and, at the same time, the energy required for separating the unreacted trioxane and the product (the oxymethylene copolymer) or for recovering the unreacted trioxane can be reduced so that it is economically advantageous.

Polymerization Reaction

The form of the polymerization reaction in Step 1 is not particularly limited, and it can be carried out in the same form as the conventionally known process for producing an oxymethylene copolymer. That is, it may be any of bulk polymerization, suspension polymerization, solution polymerization or melt polymerization, and bulk polymerization is particularly preferable.

A polymerization apparatus to be used for the polymerization reaction is not particularly limited and, for example, in the case of bulk polymerization, in a batch type, a reaction vessel equipped with a stirrer generally used in the production of an oxymethylene copolymer can be used, and in a continuous type, a co-kneader, a twin-screw screw type continuous extrusion mixer, a twin-screw paddle type continuous mixer, etc., which have conventionally been proposed apparatus for continuously polymerizing trioxane, etc., can be used, and a plurality of polymerization apparatuses can be used in combination.

A temperature of the polymerization reaction is not particularly limited, and is generally 60 to 120° C. A pressure during the polymerization reaction is not particularly limited, and when the atmospheric pressure is made 100 kPa, it is preferably in the range of 99.0 to 101.00 kPa in absolute pressure. A time (residence time in the polymerization apparatus) of the polymerization reaction is not particularly limited, and is generally 2 to 30 minutes.

At the time of the polymerization reaction in Step 1, a molecular weight controller may be added to control the molecular weight of the obtainable oxymethylene copolymer. A kind of the molecular weight controller is not particularly limited and may be mentioned, for example, methylal, methoxymethylal, dimethoxymethylal, trimethoxymethylal and oxymethylene di-n-butyl ether. Among them, methylal is preferable. An amount of the molecular weight controller to be added is controlled in the range of 0% by mass or more and 0.1% by mass or less based on the total mass of trioxane and the comonomer in the polymerization raw materials depending on the molecular weight of the target oxymethylene copolymer.

The method of supplying and adding trioxane, the comonomer, the acid catalyst and the molecular weight controller to be used in Step 1 to the polymerization apparatus is not particularly limited, and it is preferable to use the method in which a part or the whole of them is sufficiently mixed while maintaining the liquid phase state, a mixed solution of the obtained polymerization raw materials is fed to the polymerization apparatus and the polymerization reaction is carried out, since it is possible to reduce an amount of the catalyst necessary for the polymerization reaction, and as a result, the amount of generated formaldehyde of the oxymethylene copolymer can be reduced.

In addition, in step 1, it is preferable to add the acid catalyst by diluting with an organic solvent since the acid catalyst can be dispersed uniformly in the reaction system. The organic solvent is not particularly limited as long as it is a solvent which does not significantly inhibit the polymerization reaction and may be mentioned, for example, an ether such as ethylene glycol dimethyl ether, diethylene glycol dimethyl ether and n-butyl ether, etc.; an aromatic hydrocarbon such as benzene and toluene, etc.; an aliphatic hydrocarbon such as n-hexane and cyclohexane, etc.; and a halogenated hydrocarbon such as dichloromethane and 1,2-dichloroethane, etc.

The yield (reaction rate in the polymerization reaction) of the product obtained in Step 1 is not particularly limited, and is preferably 92% or more, more preferably 95% or more, and particularly preferably 97% or more, and it is preferable to control the amount of the acid catalyst and the time of the polymerization reaction, etc., to give these yields. By making the yield of the product 92% or more, it is possible to reduce energy consumption for recovery of the unreacted raw materials.

Step 2

The process for producing an oxymethylene copolymer of the present invention comprises Step 2 of adding a hydroxylamine compound represented by the following general formula (1) to the product obtained in the above-mentioned Step 1 and mixing them.

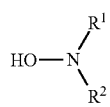
(1)

wherein $R^1$ and $R^2$ each independently represent a hydrogen atom or an organic group having 1 to 20 carbon atoms.

Termination of Polymerization Reaction

The product obtained in Step 1 is in a state in which the polymerization reaction is not terminated, and by adding the hydroxylamine compound represented by the above-mentioned general formula (1) to the product, the polymerization reaction is terminated. That is, the hydroxylamine compound represented by the above-mentioned general formula (1) has a role as a deactivator of the acid catalyst used in Step 1. As mentioned above, the compound is considered to also act as an antioxidant of the product obtained in Step 1 simultaneously with the action as a deactivator of the acid catalyst. Accordingly, it can be presumed that depolymerization of the product formed in Step 1 can be suppressed, so that formation of formic acid due to oxidation of formaldehyde derived from unreacted raw materials or formaldehyde derived from a hemiformal terminal group and decomposition reaction caused by formic acid can be suppressed. As a result, it can be presumed that an oxymethylene copolymer in which deterioration due to oxidation hardly occurs, the amount of formaldehyde generated from the product, in particular, the amount of formaldehyde generated from the product when stored for a long time under environment of high temperature and high humidity is reduced, and occurrence of mold deposit during molding is small can be obtained.

Termination of the polymerization reaction may be carried out by using a compound such as triphenylphosphine, triethylamine, tributylamine, triethanolamine, N-methyldiethanolamine, etc., which are conventionally known as a deactivator. However, when these compounds are used, the effect as a deactivator is satisfactory, but characteristics such as suppression of oxidative deterioration, improvement in heat resistance and moist heat resistance, suppression of MD generation, etc. are insufficient. In addition, when a basic compound known as an antioxidant such as a hindered amine including bis(2,2,6,6-tetramethyl-4-piperidyl)sebacate (available from BASF, Registered Trademark, Tinuvin 770), a mixture (available from BASF, Registered Trademark, Tinuvin 765) of bis(1,2,2,6,6-pentamethyl-4-piperidyl)sebacate and methyl 1,2,2,6,6-pentamethyl-4-piperidylsebacate, etc., is used, these hindered amines act as a deactivator, but the effects of suppressing deterioration due to oxidation, generation of formaldehyde from the product, in particular, increase in an amount of formaldehyde generated from the product when stored for a long time under environment of high temperature and high humidity, and occurrence of mold deposit during molding are insufficient. On the other hand, only when the hydroxylamine compound represented by the above-mentioned general formula (1) is used, in addition to the action as a deactivator, there are characteristics that deterioration due to oxidation hardly occurs, the amount of formaldehyde generated from the product, in particular, the amount of formaldehyde generated from the product when stored for a long time under environment of high temperature and high humidity is reduced, and occurrence of mold deposit during molding is small.

Hydroxylamine Compound

The hydroxylamine compound is not particularly limited as long as it is a compound represented by the above-mentioned general formula (1). In the general formula (1), $R^1$ and $R^2$ each independently represent a hydrogen atom or an organic group having 1 to 20 carbon atoms.

Here, the organic group having 1 to 20 carbon atoms is, for example, a linear or branched alkyl group having 1 to 20 carbon atoms, an aryl group having 6 to 20 carbon atoms or an arylalkyl group having 7 to 20 carbon atoms, and these groups may be substituted with at least one substituent selected from a hydroxyl group, a carboxyl group, an alkoxy group having 1 to 19 carbon atoms, an alkoxycarbonyl group having 2 to 19 carbon atoms, an alkoxycarbonylalkoxy group having 3 to 19 carbon atoms and a carboxyalkoxy group having 2 to 19 carbon atoms. Accordingly, it is preferable that $R^1$ and $R^2$ each independently represent a hydrogen atom, a linear or branched alkyl group having 1 to 20 carbon atoms, an aryl group having 6 to 20 carbon atoms or an arylalkyl group having 7 to 20 carbon atoms. It is more preferable that $R^1$ and $R^2$ each independently represent a hydrogen atom, a linear or branched alkyl group having 1 to 20 carbon atoms, or an arylalkyl group having 7 to 20 carbon atoms (provided that both of $R^1$ and $R^2$ are not simultaneously hydrogen atoms).

Among the above-mentioned examples, the hydroxylamine compound represented by the above-mentioned general formula (1) wherein $R^1$ and $R^2$ each independently represent a hydrogen atom, a methyl group, an ethyl group, a propyl group, an isopropyl group, a butyl group, a hexadecyl group, an octadecyl group or a benzyl group (provided that both of $R^1$ and $R^2$ are not simultaneously hydrogen atoms) is further preferable, and the hydroxylamine compound represented by the above-mentioned general formula (1) wherein $R^1$ and $R^2$ both represent ethyl groups, octadecyl groups or benzyl groups is particularly preferable. One of the above-mentioned hydroxylamine compounds may be used alone, or two or more thereof may be used in combination.

As such a hydroxylamine compound, specifically preferred are N,N-diethylhydroxylamine, N-isopropylhydroxylamine, N,N-bisoctadecylhydroxylamine and N,N-dibenzylhydroxylamine, more preferred are N,N-diethylhydroxylamine, N,N-bisoctadecylhydroxylamine and N,N-dibenzylhydroxylamine, and above all, N,N-diethylhydroxylamine is particularly preferred since it is excellent in characteristics that deterioration due to oxidation hardly occurs, an amount of formaldehyde generated from the product, in particular, the amount of formaldehyde generated from the product when stored for a long time under environment of high temperature and high humidity is reduced, and occurrence of mold deposit during molding is small, and it can be easily obtained.

In addition, the hydroxylamine compound is commercially available in the form of a solid or powder, in the form of an aqueous solution or a solution of an organic solvent, and any form can be used. Among them, it is preferable to use it in the form of a solution of an organic solvent.

The hydroxylamine compound is added to the product obtained in Step 1 and mixed. In this case, the hydroxylamine compound may be added as it is (solid state or solution state), or may be added by diluting with an organic solvent. When it is diluted with an organic solvent, the organic solvent is not particularly limited as long as it is a solvent which does not significantly inhibit the polymerization reaction and there may be used, for example, an aromatic hydrocarbon such as benzene, toluene and xylene; an aliphatic hydrocarbon such as n-hexane, n-heptane and cyclohexane; an alcohol having 1 to 3 carbon atoms such as methanol and ethanol; a halogenated hydrocarbon such as chloroform, dichloromethane and 1,2-dichloroethane; and a ketone such as acetone and methyl ethyl ketone.

An amount of the hydroxylamine compound to be added is preferably equimolar or more and 20-fold mol or less based on an amount of the acid catalyst to be used in Step 1, in particular, $BF_3.OEt_2$. When the amount to be added is equimolar or less, deactivation of the acid catalyst is insufficient and the amount of formaldehyde generated from the product increases. When the amount of the hydroxylamine compound to be added is in the range of equimolar or more and 20-fold mol or less, preferable effects can be obtained, but it is economically advantageous when the amount to be added is small, so that it is more preferably 10-fold mol or less, further preferably 7-fold mol or less, and particularly preferably 5-fold mol or less.

Mixing

The apparatus for carrying out addition and mixing of the hydroxylamine compound, and the timing of the addition are not particularly limited and, for example, there may be mentioned a method in which a mixer having the same specifications as the above-mentioned polymerization apparatus and connected in series to the polymerization apparatus is used, and the hydroxylamine compound is added at the inlet of the mixer and mixed. A temperature at which the hydroxylamine compound is added and mixed is not particularly limited, and is preferably 0 to 160° C., particularly preferably 0 to 120° C. Also, a pressure is not particularly limited, and when the atmospheric pressure is made 100 kPa, it is preferably in the range of 99.0 to 101.0 kPa in absolute pressure. A time for carrying out the mixing (residence time in the mixer) after the addition is not particularly limited, and is preferably 1 to 150 minutes, particularly preferably 1 to 120 minutes.

Step 3

The process for producing an oxymethylene copolymer of the present invention comprises Step 3 of further melting and kneading the mixture of the product and the hydroxylamine compound obtained by the above-mentioned Step 2. By melting and kneading the mixture of the product and the hydroxylamine compound represented by the above-mentioned general formula (1) obtained in Step 2, deactivation of the acid catalyst used in Step 1 proceeds and the acid catalyst is further deactivated. At the same time, the product and the hydroxylamine compound are melted and kneaded, so that the action of the hydroxylamine compound as the antioxidant is considered to be increased. That is, it can be presumed that, by melting and kneading the mixture of the product and the hydroxylamine compound, depolymerization of the product formed in Step 1 is further suppressed, and formation of formic acid due to oxidation of formaldehyde derived from the unreacted raw materials or formaldehyde derived from a hemiformal terminal group(—O—$CH_2$—OH) and decomposition reaction caused by formic acid are more suppressed, whereby thermal stability of the finally obtained oxymethylene copolymer can be improved. According to this procedure, it can be considered that an oxymethylene copolymer in which deterioration due to oxidation hardly occurs, an amount of formaldehyde generated from the product, in particular, the amount of formaldehyde generated from the product when stored for a long time under environment of high temperature and high humidity is reduced, and occurrence of mold deposit during molding is small can be obtained.

Melting and Kneading

An apparatus for subjecting to melting and kneading is not particularly limited as long as it has a function of melting and kneading the product obtained in Step 1 and, for example, melting and kneading may be carried out by using the above-mentioned mixer for mixing the product and the hydroxylamine compound, which is connected in series to the polymerization apparatus. The apparatus for carrying out melting and kneading preferably has a vent function, and such an apparatus may be mentioned, for example, a single screw or multi screw continuous extrusion kneader having at least one vent hole, a twin screw surface-renewal type horizontal reactor, etc. Each of these apparatuses may be used alone, or two or more apparatuses may be used in combination.

A temperature at which melting and kneading are carried out is not particularly limited as long as it is the melting point of the product obtained in Step 1 or higher, and is preferably a temperature range of 170° C. or higher and 270° C. or lower, and more preferably 190° C. or higher and 250° C. or lower. When the temperature of melting and kneading is 270° C. or lower, decomposition and deterioration of the product and the oxymethylene copolymer obtained by melting and kneading hardly occur during melting and kneading.

A pressure at which melting and kneading are carried out is not particularly limited, and in order to remove trioxane which is an unreacted raw material, a formaldehyde component derived from trioxane, formaldehyde derived from hemiformal terminal, etc., it is preferably carried out under reduced pressure together with a degassing treatment. The degassing under reduced pressure is carried out from the vent hole mentioned above. Therefore, the pressure at melting and kneading is, when the atmospheric pressure is made 100 kPa, preferably in the range of 10 to 100 kPa, more preferably in the range of 10 to 70 kPa, particularly preferably in the range of 10 to 50 kPa in absolute pressure.

A time to carry out the melting and kneading (residence time in the melting and kneading apparatus) is not particularly limited, and is preferably 1 to 60 minutes, particularly preferably 1 to 40 minutes.

Optional Component

Other Antioxidant, Heat Resistant Stabilizer

In the process for producing an oxymethylene copolymer of the present invention, an antioxidant other than the hydroxylamine compound represented by the above-mentioned general formula (1) (in the present specification, it is referred to as "other antioxidant") and/or a heat resistant stabilizer may be further added within the range which does not impair the objects of the present invention. A timing of the addition may be either in Step 2 or Step 3, or may be carried out in the both steps. That is, it may be added at the same time as the addition of the hydroxylamine compound represented by the above-mentioned general formula (1) in Step 2, or may be added in Step 3. One of these other antioxidants and heat resistant stabilizers may be added alone, or two or more thereof may be added in combination.

In the process for producing an oxymethylene copolymer of the present invention, it is preferable to add other antioxidant(s) and to use it in combination with the hydroxylamine compound represented by the general formula (1). A timing of the addition may be either in Step 2 or Step 3, or may be carried out at a plurality of timings, and it is more preferable to add other antioxidant(s) in Step 3. This is because oxidation deterioration is further suppressed by using other antioxidant(s) in combination.

The other antioxidant is not particularly limited and may be mentioned, for example, a hindered phenol compound.

The hindered phenol compound is not particularly limited and may be mentioned, for example, 2,2'-methylene-bis(4-methyl-6-t-butylphenol), 4,4'-methylene-bis(2,6-di-t-butylphenol), 1,3,5-trimethyl-2,4,6-tris(3,5-di-t-butyl-4-hydroxybenzyl)benzene, 3,5-di-t-butyl-4-hydroxybenzyldimethylamine, distearyl-3,5-di-t-butyl-4-hydroxybenzyl phosphonate, diethyl-3,5-di-t-butyl-4-hydroxybenzyl phosphonate, 2,6,7-trioxa-1-phosphorbicyclo[2.2.2]octo-4-yl-methyl-3,5-di-t-butyl-4-hydroxyhydroc innamate, 3,5-di-t-butyl-4-hydroxyphenyl-3,5-distearyl-thiotriazylamine, 2-(2-hydroxy-3,5-di-t-butylphenyl)-5-chlorobenzotriazole, 2,6-di-t-butyl-4-hydroxymethylphenol, 2,4-bis-(n-octylthio)-6-(4-hydroxy-3,5-di-t-butylanilino)-1,3,5-triazine, N,N'-hexamethylenebis(3,5-di-t-butyl-4-hydroxy-hydrocinnamamide), octadecyl-3-(3,5-di-t-butyl-4-hydroxyphenyl)propionate, 1,6-hexanediol-bis[3-(3,5-di-t-butyl-4-hydroxyphenyl)propionate], pentaerythritol-tetrakis[3-(3,5-di-t-butyl-4-hydroxyphenyl)propionate], triethylene glycol-bis[3-(3,5-dimethyl-4-hydroxyphenyl)propionate], triethylene glycol-bis[3-(3-t-butyl-5-methyl-4-hydroxyphenyl)propionate], triethylene glycol-bis[3-(3,5-di-t-butyl-4-hydroxyphenyl)propionate], 2,2'-thiodiethyl-bis[3-(3,5-di-t-butyl-4-hydroxyphenyl)propionate], etc. Among these, 1,3,5-trimethyl-2,4,6-tris(3,5-di-t-butyl-4-hydroxybenzyl)benzene, pentaerythritol-tetrakis[3-(3,5-di-t-butyl-4-hydroxyphenyl)propionate] and triethylene glycol-bis[3-(3-t-butyl-5-methyl-4-hydroxyphenyl)propionate] are particularly preferred. One of these hindered phenol compounds may be used alone, or two or more thereof may be used in combination.

An amount of the other antioxidant to be added is not particularly limited, and it is preferably 0.01 to 3.0 parts by mass, more preferably 0.05 to 2.0 parts by mass, and further preferably 0.1 to 1.0 part by mass based on 100 parts by mass of the oxymethylene copolymer.

In the process for producing an oxymethylene copolymer of the present invention, it is preferable to add a heat resistant stabilizer and to use it in combination with the hydroxylamine compound represented by the general formula (1). A timing of the addition may be either in Step 2 or Step 3, or may be carried out at a plurality of timings, and it is more preferable to add the heat resistant stabilizer in Step 3. This is because generation of formaldehyde from the oxymethylene copolymer is further suppressed by using the heat resistant stabilizer in combination.

The heat resistant stabilizer is not particularly limited and may be mentioned, for example, an amino-substituted triazine compound, and one or more of a metal-containing compound selected from the group consisting of a hydroxide, an inorganic acid salt, an alkoxide and a mineral (for example, hydrotalcite) of an alkali metal or an alkaline earth metal. One of the heat resistant stabilizers may be used alone, or two or more thereof may be used in combination.

A total amount of the heat resistant stabilizer to be added is not particularly limited and is preferably 0.01 to 3.0 parts by mass, more preferably 0.025 to 2.0 parts by mass, and particularly preferably 0.05 to 1.0 part by mass based on 100 parts by mass of the oxymethylene copolymer.

The amino-substituted triazine compound is not particularly limited and may be mentioned, for example, guanamine, melamine, N-butylmelamine, N-phenyl-melamine, N,N-diphenylmelamine, N,N-diallylmelamine, N,N',N"-triphenylmelamine, N,N',N"-trimethylol melamine, benzoguanamine, 2,4-diamino-6-methyl-sym-triazine, 2,4-diamino-6-butyl-sym-triazine, 2,4-diamino-6-benzyloxy-sym-triazine, 2,4-diamino-6-butoxy-sym-triazine, 2,4-diamino-6-cyclohexyl-sym-triazine, 2,4-diamino-6-chloro-sym-triazine, 2,4-diamino-6-mercapto-sym-triazine, ammeline (2,4-diamino-6-hydroxy-sym-triazine), N,N,N',N'-tetracyanoethylbenzoguanamine, or initial polycondensates of these and formaldehyde (for example, a water-soluble melamine-formaldehyde resin). Among these, melamine, methylol melamine, benzoguanamine and a water-soluble melamine-formaldehyde resin are particularly preferable. One of these amino-substituted triazine compounds may be used alone, or two or more thereof may be used in combination.

One or more of the metal-containing compound selected from the group consisting of a hydroxide, an inorganic acid salt, an alkoxide and a mineral (for example, hydrotalcite) of an alkali metal or an alkaline earth metal is not particularly limited. The hydroxide of an alkali metal or an alkaline earth metal may be mentioned, for example, sodium hydroxide, potassium hydroxide, calcium hydroxide and magnesium hydroxide. The inorganic acid salt may be mentioned a carbonate, a phosphate, a silicate, a borate, etc. The alkoxide may be mentioned a methoxide, ethoxide, etc. As the mineral, hydrotalcite represented by the following general formula (2) can be used.

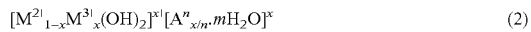

(2)

In the formula (2), $M^{2+}$ is not particularly limited and represents, for example, a divalent metal ion such as $Mg^{2+}$, $Mn^{2+}$, $Fe^{2+}$ and $Co^{2+}$. $M^{3+}$ is not particularly limited and represents, for example, a trivalent metal ion such as $Al^{3+}$, $Fe^{3+}$ and $Cr^{3+}$. $A^{n-}$ is not particularly limited and represents, for example, an n-valent (particularly monovalent or divalent) anion such as $CO_3^{2-}$, $OH^-$, $HPO_4^{2-}$ and $SO_4^{2-}$. x is $0<x<0.5$, and m is $0 \leq m < 1$.

The method of adding the other antioxidant and/or heat resistant stabilizer mentioned above is not particularly limited and may be mentioned, for example, a method of supplying to the mixer together with the hydroxylamine compound represented by the general formula (1) in Step 2, a method of mixing the mixture of the product and the hydroxylamine compound obtained in Step 2, and the other antioxidant and/or heat resistant stabilizer mentioned above immediately before melting and kneading of Step 3, using a mixer, a tumbler type blender, etc., and a method of supplying the other antioxidant and/or heat resistant stabilizer mentioned above to the melting and kneading apparatus in Step 3.

Other Components which May be Added

In the process for producing an oxymethylene copolymer of the present invention, it is possible to further add a conventionally known additive(s) and/or filler(s) in addition to the other antioxidant and/or heat resistant stabilizer mentioned above within the range which does not impair the effects of the present invention. The additive may be mentioned a mold release agent, an antistatic agent, a weather resistant stabilizer, a fluorescent brightening agent, a nucleating agent, etc.

By adding the mold release agent, mold releasability of the oxymethylene copolymer can be improved. Such a mold release agent is not particularly limited, and polyalkylene glycol, polyethylene, silicone oil, a fatty acid, a fatty acid ester, a fatty acid metal salt, or a higher fatty acid amide having a long chain of 10 or more carbon atoms is preferable. One of these may be used alone, or two or more thereof may be used in combination.

An amount of the mold release agent to be added is not particularly limited as long as it does not impair the objects of the present invention, and is preferably 0.01 to 3.0 parts by mass, more preferably 0.05 to 2.5 parts by mass, and particularly preferably 0.05 to 2.0 parts by mass based on 100 parts by mass of the oxymethylene copolymer.

By adding a nucleating agent, it is possible to improve formability and shorten the molding cycle. The nucleating agent is not particularly limited, and boron nitride, hydrous magnesium silicate and three-dimensionally crosslinked polyacetal are preferable.

An amount of the nucleating agent to be added is not particularly limited as long as it does not impair the objects of the present invention, and is preferably 0.001 to 3.0 parts by mass, more preferably 0.002 to 2.5 parts by mass, and particularly preferably 0.003 to 2.0 parts by mass based on 100 parts by mass of the oxymethylene copolymer.

By adding a fluorescent brightening agent, whiteness of the oxymethylene copolymer can be improved. The fluorescent brightening agent is not particularly limited and may be mentioned, for example, a coumarine-based fluorescent brightening agent and a benzoxazole-based fluorescent brightening agent. Such a fluorescent brightening agent is preferably 3-(4'-acetylaminophenyl)-7-acetylaminocoumarine, 3-(4'-carboxyphenyl)-4-methyl-7-diethylaminocoumarine and 2,5-bis(5'-t-butylbenz-oxazol-2'-yl)thiophene.

An amount of the fluorescent brightening agent to be added is not particularly limited as long as it does not impair the objects of the present invention, and is preferably 0.1 to 20 ppm by mass, more preferably 0.5 to 10 ppm by mass, and particularly preferably 1.0 to 5.0 ppm by mass in the oxymethylene copolymer.

The weather resistant stabilizer is not particularly limited, a photostabilizer or an ultraviolet absorber is preferably used. As the photostabilizer, a hindered amine-based photostabilizer is preferably used. Specific examples of the hindered amine-based photostabilizer may include, for example, bis(1,2,2,6,6-pentamethyl-4-piperidinyl)sebacate, 1-[2-{3-(3,5-di-t-butyl-4-hydroxyphenyl) propionyloxy}ethyl]-4-[3-(3,5-di-t-butyl-4-hy droxyphenyl) propionyloxy]-2,2,6,6-tetramethylpiperidine, tetrakis(1,2,2, 6,6-pentamethyl-4-piperidyl)-1,2,3,4-butanetetracarboxylate, 1,2,2,6,6-pentamethyl-4-piperidyl and tridecyl-1,2,3,4-butanetetracarboxylate (a mixture of a compound in which a part of four ester portions of the butanetetracarboxylate is/are a 1,2,2,6,6-pentamethyl-4-piperidyl group(s) and other(s) is/are a tridecyl group(s)), a condensate of 1,2,3,4-butanetetracarboxylic acid, 1,2,2,6,6-pentamethyl-4-piperidinol and β,β,β,β-tetramethyl-3,9(2,4, 8,10-tetraoxaspiro[5.5]undecane)-diethanol, a condensate of dimethyl succinate and 4-hydroxy-2,2,6,6-tetramethyl-1-piperidine ethanol, 1,2,2,6,6-pentamethyl-4-piperidyl methacrylate, N,N',N'',N'''-tetrakis-(4,6-bis-(butyl-(N-methyl-2, 2,6,6-tetramethylpiperidine-4-yl)amino)-triazin-2-yl)-4,7-diazadecane-1,10-diamine, and bis(1,2,2,6,6-pentamethyl-4-piperidyl)[[3,5-bis(1,1-dimethylethyl)-4-hydroxyphenyl] methyl]butylmalonate. One of the above-mentioned weather resistant stabilizers may be used alone, or two or more thereof may be used in combination.

An amount of the weather resistant stabilizer to be added is not particularly limited, and is preferably 0.01 to 3.0 parts by mass, more preferably 0.03 to 2.0 parts by mass, and particularly preferably 0.05 to 1.0 part by mass based on 100 parts by mass of the oxymethylene copolymer.

A timing of addition of other components which may be added as mentioned above may be either in Step 2, in Step 3, or after Step 3, as long as it does not impair the objects of the present invention, and it may be carried out at a plurality of timings. As a method of adding other components which may be added after Step 3, there may be mentioned a method in which the other components which may be added as mentioned above is added to the oxymethylene copolymer obtained through Step 3, and further subjecting to melting and kneading using a single screw or multi screw extruder, etc.

Use of Oxymethylene Copolymer

The oxymethylene copolymer obtained by the production process of the present invention can be molded and processed into various forms according to a known molding process of the oxymethylene copolymer. A molded product comprising the oxymethylene copolymer of the present invention may be mentioned shapes such as pellets, round bars, thick plates, sheets, tubes, cylinders and rectangular containers, and the invention is not limited thereto.

The oxymethylene copolymer and the molded product thereof of the present invention can be used for various parts such as machinery, electricity, automobiles, building materials and the like which are conventionally known as applications of the oxymethylene copolymer. In particular, the molded product of the present invention is less susceptible to oxidative deterioration and can suppress generation of formaldehyde even under environment of high temperature and high humidity, so that it is suitable for use in automotive parts and building materials used under environment of high temperature and high humidity.

EXAMPLES

In the following, the present invention will be specifically explained with regard to the embodiments and the effects thereof by showing Examples and Comparative examples, but the present invention is not limited by these examples at all.

Raw Materials

The raw materials (a catalyst, an additive, an antioxidant and a heat resistant stabilizer) used in Examples and Comparative examples are as follows. The symbols correspond to those used in Table 2.
(1) Catalyst
B-1: Boron trifluoride diethyl ether (available from BASF)
(2) Additives
A-1: N,N-diethylhydroxylamine (available from Arkema, anhydride)
A-2: N,N-bisoctadecylhydroxylamine (available from Aldrich)
A-3: N,N-dibenzylhydroxylamine (available from Aldrich)
A-4: N-isopropylhydroxylamine (available from ANGUS Chemical Company)
A-5: Triphenylphosphine (available from Hokko)
A-6: Tinuvin 770 (Registered Trademark, available from BASF)
A-7: Tinuvin 765 (Registered Trademark, available from BASF)
A-8: Tributylamine (available from Arkema)
A-9: Triethylamine (available from Arkema)
A-10: Triethanolamine (available from Dow Chemical)
A-11: N-methyldiethanolamine (available from Dow Chemical)
A-12: Diisopropanolamine (available from Dow Chemical)
(3) Antioxidant and heat resistant stabilizer
C: Irganox 245 (Registered Trademark, available from BASF): antioxidant
D: Melamine (available from Mitsui Chemicals, Inc.): heat stabilizer Evaluation Method Respective physical properties of the oxymethylene copolymer obtained in Examples and Comparative examples were measured as follows.

(1) Formaldehyde Generated Amount

The oxymethylene copolymers obtained in Examples and Comparative examples were each cut to a size of 10 to 30 mg, dried with hot air at 120° C. for 3 hours, then, charged in a vial bottle with a capacity of 22 mL and the mass of the sample was precisely weighed. Thereafter, it was hermetically sealed and heat-treated at 160° C. for 2 hours with HS-GC (SHIMADZU: Gas Chromatograph (GC-2010), Perkin Elmer: Headspace sample (Turbomatrix 40)) manufactured by Shimadzu Corporation, the generated gas was injected into a column, and the peak integral area of formaldehyde in the gas detected by gas chromatography was calculated. It was converted into mass using a previously prepared calibration curve, and a formaldehyde generated amount (ppm) per mass of the oxymethylene copolymer was obtained. The formaldehyde generated amount corresponds to the amount of formaldehyde generated from the product.

(2) Formaldehyde Generated Amount at Humidification Treatment

The oxymethylene copolymers obtained in Examples and Comparative examples were each cut to a size of 10 to 30 mg, and subjected to a humidified heat treatment under the conditions of at 80° C. and a relative humidity of 95% (95% RH) for 96 hours. In the subsequent operation, the formaldehyde generated amount (ppm) per mass of the oxymethylene copolymer was determined in the same manner as in the above-mentioned (1). The amount of formaldehyde generated during this humidification treatment is assumed to be the amount of formaldehyde generated from the product when stored for a long time under environment of high temperature and high humidity.

(3) ΔMI Value

The MI value (melt index) was measured according to ISO1133 (190° C., under a load of 2.16 kg). The MI value was measured on a sample melted and kneaded at 220° C. for 20 minutes by using LABO PLASTMILL, and the difference between the case where melting and kneading were carried out under a nitrogen atmosphere and the case where it was carried out under an air atmosphere (ΔMI value=MI value in the case of melting and kneading in an air atmosphere—MI value in the case of melting and kneading in a nitrogen atmosphere) was defined as ΔMI value. The smaller the ΔMI value is, the less deterioration caused by oxidation occurs and the better the product is.

(4) MD (Mold Deposit) Evaluation

Injection molding apparatus: The state of the amount of deposits on the mold when 4,000 shots of polymer samples were continuously molded using Sumitomo (M18) was evaluated in three grades of ◯, Δ and X.

TABLE 1

| Mold contamination | Contamination small | ○ △ ✕ | Contamination remarkable |
|---|---|---|---|

Example 1

<<Step 1>>

Under nitrogen atmosphere, 3,000 g of trioxane (purity: 99.96%) and 126 g of 1,3-dioxolane (purity: 99.99%) as a comonomer were charged in a 5 L polymerization reactor equipped with a stirrer maintained at 60° C., and then, boron trifluoride diethyl etherate (B-1) was added as a polymerization catalyst (acid catalyst) in an amount of 0.030 mmol based on 1 mol of the used trioxane, and the mixture was reacted for 15 minutes.

<<Step 2>>

After 15 minutes from the addition of the polymerization catalyst in Step 1, N,N-diethylhydroxylamine (A-1) was added as an additive in an amount of 2-fold mol based on the amount of the used polymerization catalyst. At this time, the additive was preliminarily diluted with benzene so as to have a concentration of 1 mol/L and added. Five minutes after addition of the additive, the reactor was stopped to obtain a mixture of the oxymethylene copolymer as the product of Step 1 and the hydroxylamine compound.

<<Step 3>>

To 45 g of the mixture obtained in Step 2 were added 0.135 g of Irganox 245 as an antioxidant and 0.045 g of melamine as a heat resistant stabilizer, and the mixture was melted and kneaded at 222° C. for 20 minutes to obtain an oxymethylene copolymer.

Examples 2 to 5

In the same manner as in Example 1 except for adding N,N-diethylhydroxylamine (A-1) as an additive in an amount of 1, 4, 10 and 20-fold mol, respectively, based on the amount of the used polymerization catalyst instead of 2-fold mol, oxymethylene copolymers were obtained.

Examples 6 to 8

In the same manner as in Example 1 except for using N,N-bisoctadecylhydroxylamine (A-2), N,N-dibenzylhydroxylamine (A-3) and N-isopropylhydroxylamine (A-4) as an additive, respectively, in place of N,N-diethylhydroxylamine (A-1), oxymethylene copolymers were obtained.

Example 9

In the same manner as in Example 1 except for adding $BF_3(OEt)_2$ (B-1) in an amount of 0.020 mmol based on 1 mol of the used trioxane, and adding N,N-diethylhydroxylamine (A-1) in an amount of 5-fold mol based on the amount of the used polymerization catalyst, an oxymethylene copolymer was obtained.

Comparative Examples 1 to 8

In the same manner as in Example 1 except for using triphenylphosphine (A-5), Tinuvin 770 (A-6), Tinuvin 765 (A-7), tributylamine (A-8), triethylamine (A-9), triethanolamine (A-10), N-methyldiethanolamine (A-11) and diisopropanolamine (A-12) in place of N,N-diethylhydroxylamine (A-1) as an additive, respectively, oxymethylene copolymers were obtained.

The results of evaluating the oxymethylene copolymers obtained in Examples and Comparative examples by the above-mentioned method are shown in Table 2.

TABLE 2

| | Additive | | | Catalyst | | Formaldehyde generated amount | | MI | | | |
|---|---|---|---|---|---|---|---|---|---|---|---|
| | | Used amount | | | Used amount mmol/ | | | Under $N_2$ | Under Air | $\Delta$ MI | |
| | Kind | fold-mol/ mol-cat. | phr-POM | Kind | mol-TOX | Normal ppm | humidification ppm | g/10 min. | g/10 min. | (Air-$N_2$) g/10 min. | MD |
| Example-1 | A-1 | 2 | 0.0057 | B-1 | 0.03 | 62.0 | 97.0 | 2.0 | 2.4 | 0.4 | ○ |
| Example-2 | A-1 | 1 | 0.0029 | B-1 | 0.03 | 68.0 | 101.0 | 1.8 | 2.1 | 0.3 | ○ |
| Example-3 | A-1 | 4 | 0.0114 | B-1 | 0.03 | 60.0 | 92.0 | 2.8 | 3.3 | 0.5 | ○ |
| Example-4 | A-1 | 10 | 0.0285 | B-1 | 0.03 | 71.8 | 102.5 | 1.6 | 1.9 | 0.3 | ○ |
| Example-5 | A-1 | 20 | 0.0570 | B-1 | 0.03 | 70.2 | 106.6 | 1.6 | 1.8 | 0.2 | ○ |
| Example-6 | A-2 | 2 | 0.0344 | B-1 | 0.03 | 70.0 | 105.0 | 2.9 | 3.6 | 0.7 | ○ |
| Example-7 | A-3 | 2 | 0.0126 | B-1 | 0.03 | 75.0 | 103.0 | 3.6 | 4.5 | 0.9 | ○ |
| Example-8 | A-4 | 2 | 0.0048 | B-1 | 0.03 | 72.0 | 101.0 | 3.7 | 4.5 | 0.8 | ○ |
| Example-9 | A-1 | 5 | 0.0095 | B-1 | 0.02 | 58.0 | 82.0 | 1.7 | 1.9 | 0.2 | ○ |
| Comparative example-1 | A-5 | 2 | 0.0168 | B-1 | 0.03 | 84.0 | 125.0 | 2.0 | 2.9 | 0.9 | △ |
| Comparative example-2 | A-6 | 2 | 0.0307 | B-1 | 0.03 | 93.0 | 139.0 | 3.2 | 4.2 | 1.0 | ✕ |
| Comparative example-3 | A-7 | 2 | 0.0325 | B-1 | 0.03 | 85.0 | 131.0 | 3.1 | 6.9 | 3.8 | ✕ |
| Comparative example-4 | A-8 | 2 | 0.0118 | B-1 | 0.03 | 65.0 | 143.0 | 2.8 | 4.7 | 1.9 | ○ |
| Comparative example-5 | A-9 | 2 | 0.0065 | B-1 | 0.03 | 76.0 | 138.0 | 2.9 | 4.9 | 2.0 | ○ |
| Comparative example-6 | A-10 | 2 | 0.0095 | B-1 | 0.03 | 130.0 | 455.0 | 2.9 | 4.6 | 1.7 | ○ |
| Comparative example-7 | A-11 | 2 | 0.0076 | B-1 | 0.03 | 106.0 | 306.0 | 3.8 | 6.3 | 2.5 | ○ |

TABLE 2-continued

| | Additive | | Catalyst | | Formaldehyde generated amount | | MI | | | |
| | | | Used amount | | | | Under | Under | ΔMI | |
| | Kind | fold-mol/ mol-cat. | phr-POM | Kind | mol-TOX | Normal ppm | humidification ppm | $N_2$ g/10 min. | Air g/10 min. | (Air-$N_2$) g/10 min. | MD |
|---|---|---|---|---|---|---|---|---|---|---|---|
| Comparative example-8 | A-12 | 2 | 0.0085 | B-1 | 0.03 | 93.0 | 297.0 | 3.8 | 5.7 | 1.9 | ○ |

From Table 2, it can be understood that by adding the hydroxylamine compound represented by the above-mentioned formula (1) to the product obtained by reacting trioxane and the comonomer, and subjecting to melting and kneading, an oxymethylene copolymer in which deterioration due to oxidation hardly occurs, an amount of formaldehyde generated from the product, in particular, the amount of formaldehyde generated from the product when stored for a long time under environment of high temperature and high humidity is reduced, occurrence of mold deposit during molding is small can be obtained.

The invention claimed is:

1. A process for producing an oxymethylene copolymer which comprises
   1) polymerizing polymerization raw materials containing trioxane and a comonomer(s) in the presence of an acid catalyst,
   2) adding a hydroxylamine compound represented by the following formula (1):

(1)

wherein $R^1$ and $R^2$ each independently represents a hydrogen atom or an organic group having 1 to 20 carbon atoms, to a product obtained in 1) and mixing these, and
   3) melting and kneading a mixture of the product and the hydroxylamine compound obtained in 2),
   wherein the hydroxylamine compound is added as a deactivating agent of the acid catalyst to deactivate the acid catalyst in 2) and 3).

2. The process for producing an oxymethylene copolymer according to claim 1, wherein the hydroxylamine compound is a hydroxylamine compound in which $R^1$ and $R^2$ each independently represents a hydrogen atom, a linear or branched alkyl group having 1 to 20 carbon atoms, an aryl group having 6 to 20 carbon atoms, or an arylalkyl group having 7 to 20 carbon atoms.

3. The process for producing an oxymethylene copolymer according to claim 1, wherein the hydroxylamine compound is N,N-diethylhydroxylamine.

4. The process for producing an oxymethylene copolymer according to claim 1, wherein an amount of the hydroxylamine compound added in 2) is 1 to 5-fold mol based on an amount of the acid catalyst.

5. The process for producing an oxymethylene copolymer according to claim 1, wherein the acid catalyst is at least one selected from the group consisting of boron trifluoride dihydrate, boron trifluoride diethyl etherate, and boron trifluoride dibutyl etherate.

6. The process for producing an oxymethylene copolymer according to claim 1, wherein the comonomer is at least one selected from the group consisting of ethylene oxide, propylene oxide, butylene oxide, styrene oxide, methyl glycidyl ether, ethyl glycidyl ether, butyl glycidyl ether, phenyl glycidyl ether, 1,3-dioxolane, propylene glycol formal, diethylene glycol formal, triethylene glycol formal, 1,4-butanediol formal, 1,5-pentanediol formal, and 1,6-hexanediol formal.

7. The process for producing an oxymethylene copolymer according to claim 1, wherein the oxymethylene copolymer contains an oxymethylene group and an oxyalkylene group having 2 or more carbon atoms, and a content of the oxyalkylene group having 2 or more carbon atoms contained in the oxymethylene copolymer is 0.4 mol or more and 15 mol or less based on 100 mol of a total of a molar amount of the oxymethylene group and a molar amount of the oxyalkylene group.

* * * * *